(12) United States Patent
Broyde et al.

(10) Patent No.: US 7,952,380 B2
(45) Date of Patent: May 31, 2011

(54) PSEUDO-DIFFERENTIAL INTERFACING DEVICE HAVING A BALANCING CIRCUIT

(75) Inventors: Frédéric Broyde, Maule (FR); Evelyne Clavelier, Maule (FR)

(73) Assignee: EXCEM SAS, Maule (FR)

( * ) Notice: Subject to any disclaimer, the term of this patent is extended or adjusted under 35 U.S.C. 154(b) by 0 days.

(21) Appl. No.: 12/598,376

(22) PCT Filed: May 16, 2008

(86) PCT No.: PCT/IB2008/051942
§ 371 (c)(1),
(2), (4) Date: Oct. 30, 2009

(87) PCT Pub. No.: WO2009/007864
PCT Pub. Date: Jan. 15, 2009

(65) Prior Publication Data
US 2010/0128814 A1    May 27, 2010

(30) Foreign Application Priority Data
Jul. 6, 2007    (FR) ...................................... 07 04889

(51) Int. Cl.
H03K 17/16    (2006.01)
H03K 19/003    (2006.01)
H04K 1/10    (2006.01)
(52) U.S. Cl. .............................. 326/21; 326/30; 375/260
(58) Field of Classification Search .................... 326/21, 326/23
See application file for complete search history.

(56) References Cited

U.S. PATENT DOCUMENTS

| | | | |
|---|---|---|---|
| 5,638,322 A | 6/1997 | Lacey | |
| 6,009,487 A * | 12/1999 | Davis et al. | 710/105 |
| 6,195,305 B1 | 2/2001 | Fujisawa et al. | |
| 6,707,724 B2 * | 3/2004 | Kim et al. | 365/189.09 |
| 6,914,597 B2 * | 7/2005 | Myers | 345/204 |

(Continued)

FOREIGN PATENT DOCUMENTS
FR    2849728 A1    7/2004

OTHER PUBLICATIONS

International Search Report for International Application No. PCT/IB2008/051942, dated Jul. 11, 2008.

*Primary Examiner* — Rexford N Barnie
*Assistant Examiner* — Dylan White
(74) *Attorney, Agent, or Firm* — Christine H. McCarthy; Barnes & Thornburg LLP

(57) ABSTRACT

The invention relates to an interfacing device for pseudo-differential transmission through interconnections used for sending a plurality of electrical signals. The interfacing device of the invention includes signal terminals and a common terminal. A transmitting circuit receives the input signals of the transmitting circuit coming from a source. The output of the transmitting circuit delivers, when the transmitting circuit is in the activated state, voltages between one of said signal terminals and said common terminal. A receiving circuit delivers, when the receiving circuit is in the activated state, output signals of the receiving circuit determined each by the voltage between one of the signal terminals and the common terminal, to the destination. The balancing circuit is such that, when the transmitting circuit is in the activated state, the current flowing out of the common terminal approximates the opposite of the sum of the currents flowing out of the signal terminals.

10 Claims, 10 Drawing Sheets

U.S. PATENT DOCUMENTS

| | | |
|---|---|---|
| 7,113,437 B2 | 9/2006 | Schweickert et al. |
| 7,362,130 B2 * | 4/2008 | Broyde et al. .................. 326/30 |
| 7,764,083 B2 * | 7/2010 | Broyde et al. .................. 326/30 |
| 7,768,298 B2 * | 8/2010 | Park et al. ....................... 326/33 |
| 2006/0192429 A1 * | 8/2006 | Broyde et al. .................... 307/4 |
| 2006/0267633 A1 | 11/2006 | King |
| 2007/0117446 A1 | 5/2007 | Broyde et al. |
| 2010/0124295 A1 * | 5/2010 | Broyde et al. ................. 375/260 |
| 2010/0213971 A1 * | 8/2010 | Broyde et al. .................. 326/26 |
| 2010/0253446 A1 * | 10/2010 | Broyde et al. ................ 333/132 |

* cited by examiner

PSEUDO-DIFFERENTIAL INTERFACING DEVICE HAVING A BALANCING CIRCUIT

CROSS-REFERENCE TO RELATED APPLICATIONS

The present application claims the benefit of priority to International Patent Application No. PCT/IB2008/051942 filed 16 May 2008, which further claims the benefit of priority to France Patent Application No. 0704889 filed 6 Jul. 2007, the contents of which are incorporated herein by reference in their entirety.

FIELD OF THE INVENTION

The invention relates to an interfacing device for pseudo-differential transmission through interconnections used for sending a plurality of electrical signals, such as the interconnections made with multiconductor cables, or with the traces of a printed circuit board, or inside an integrated circuit.

The French patent application number 07/04889 of 6 Jul. 2007, entitled "Dispositif d'interface pseudo-differential avec circuit d'équilibrage" is incorporated by reference.

PRIOR ART

Let us consider the problem of transmission through an interconnection, for obtaining m transmission channels, m being an integer greater than or equal to 2. Each transmission channel may be used for transmitting signals of any type, for instance analog signals or digital signals, from a source to a destination. We consider here that a digital signal is a signal whose value is defined only at discrete points in time, the set of the values that the signal may take on being discrete. We consider also that each value of a digital signal corresponds to a voltage or current interval. This definition of a digital signal as a "digital signal defined by voltage or current intervals" includes:

the binary signals used in binary signaling, that is to say any signal such that, in each transmission channel, the set of the values that this signal may take on has 2 elements;

the N-ary signals (N being an integer greater than or equal to 3) used in multilevel signaling, that is to say any signal such that, in each transmission channel, the set of the values that this signal may take on has N elements.

Binary signals are the signals which are the most frequently used today by digital integrated circuits, for instance the integrated circuits of the HCMOS family, which is well known to specialists. Multilevel signals, for instance quaternary signals (sometimes referred to as PAM-4 or 4-PAM), are used to obtain high bit rates. The use of such multilevel signals is for instance discussed in the article of J. L. Zerbe et al entitled "1.6 Gb/s/pin 4-PAM Signaling and Circuits for a Multidrop Bus", published in the *IEEE Journal of Solid-State Circuits*, vol. 36, No. 5, in May 2001.

We will consider that any signal which does not comply with this definition of a digital signal is an analog signal. Consequently, the result of any type of modulation of a carrier by a digital signal will be regarded as an analog signal.

The simplest transmission scheme for obtaining m transmission channels uses m single-ended links. Using m single-ended links, each transmission channel uses one transmission conductor of the interconnection, and the reference conductor (ground) is used for the return current produced by the currents flowing on the m transmission conductors. This scheme is vulnerable to the noise produced by some electromagnetic couplings between some conductors of said interconnection and other nearby conductors, for instance when said interconnection and these other conductors are built on the same printed circuit board.

However, there are transmission schemes intended to provide a good protection against the noise produced by unwanted electromagnetic couplings: differential links (see for instance the book of H. W. Johnson and M. Graham entitled *High-speed digital design: a handbook of black magic*, published by Prentice Hall PTR in 1993), and pseudo-differential links (see for instance the section II of the paper of A. Camsone, K. Farzan and D. A. Johns entitled "Differential signaling with a reduced number of signal paths" published in *IEEE Trans. Circuits Syst. II*, vol. 48, No. 3, pp. 294-300 in March 2001 and the section 4.2.3 of the book of F. Yuan entitled *CMOS current-mode circuits for data communications*, published by Springer in 2007).

A differential system for transmission providing m transmission channels uses an interconnection having 2m transmission conductors. A pseudo-differential system for transmission providing m transmission channels uses an interconnection having m transmission conductors and a common conductor distinct from the reference conductor (ground).

Interfacing devices for pseudo-differential transmission are for instance described in the patent of the U.S. Pat. No. 5,818,261 entitled "Pseudo-differential bus driver/receiver for field programmable devices", in the patent of the U.S. Pat. No. 5,994,925 entitled "Pseudo-differential logic receiver", in the patent of the U.S. Pat. No. 6,195,395 entitled "Multi-agent pseudo-differential signaling scheme" and in the patent of the U.S. Pat. No. 7,099,395 entitled "Reducing coupled noise in pseudo-differential signaling".

It should be noted that the wording "pseudo-differential" is also applied to devices which are not related in any way to pseudo-differential transmission. For instance, the patent application number US 2006/0267633 of the United States of America entitled "Pseudo-differential output driver with high immunity to noise and jitter" relates to a device having one differential input channel and one single-ended output channel: this device is not related to pseudo-differential transmission in any way. For instance, the U.S. Pat. No. 5,638,322 of the United States of America entitled "Apparatus and method for improving common mode noise rejection in pseudo-differential sense amplifiers" relates to sense amplifiers which to some extent look like conventional differential amplifiers: this invention is not related to pseudo-differential transmission in any way.

Two pseudo-differential systems for transmission each providing m=4 transmission channels are shown in FIG. 1 and in FIG. 2, these systems each comprising:

an interconnection (1) having m=4 transmission conductors (11) (12) (13) 14) plus a common conductor (10) distinct from the reference conductor (7);

a transmitting circuit (5) receiving at its input the signals of the 4 channels of the source (2);

a receiving circuit (6) having its output connected to the destination (3).

The transmitting circuit (5) receives at its input the signals of the 4 channels of the source (2), and its 5 output terminals are connected to the m+1=5 conductors of the interconnection (1), one of these conductors being the common conductor (10). The receiving circuit (6) has its 5 input terminals connected to the conductors of the interconnection (1), one of these conductors being the common conductor (10). The receiving circuit (6) produces voltages at its output terminals connected to the destination (3), each of these voltages being determined by one and only one of the voltages between one of the transmission conductors and the common conductor.

The systems shown in FIGS. 1 and 2 provide 4 transmission channels, such that the signals of the 4 channels of a source (2) are sent to the 4 channels of the destination (3).

In the FIGS. 1 and 2, we find a termination (4), as in said patent of the U.S. Pat. No. 6,195,395. In the case of FIG. 1, the termination (4) is made of m=4 resistors (401) (402) (403) (404) each connected between a transmission conductor and ground. In the case of FIG. 2, the termination (4) is made of m+1=5 resistors, m=4 resistors (401) (402) (403) (404) being connected as in FIG. 1, and a resistor (410) being connected between the common conductor (10) and the reference conductor (7).

In FIGS. 1 and 2, instead of being connected to ground, the resistors of the termination (4) could be connected to a node intended to present a fixed voltage with respect to ground, for instance a power supply voltage. This technique is for instance used in the pseudo-differential signaling scheme using integrated circuits of the Gunning Transceiver Logic (GTL) family, which is well known to specialists. Each resistor connected to a conductor of the interconnection (1) could also be replaced with another known type of termination (see for instance the chapter 6 of the above-mentioned book of H. W. Johnson and M. Graham), for instance a split termination (also referred to as "Thevenin termination") comprising 2 resistors, the first resistor being inserted between this conductor of the interconnection and ground, the second resistor being inserted between this conductor of the interconnection and a node presenting a fixed voltage with respect to ground.

As explained in said U.S. Pat. No. 5,818,261, U.S. Pat. No. 5,994,925, U.S. Pat. No. 6,195,395 and U.S. Pat. No. 7,099,395, the common conductor is mainly used to provide a fixed reference voltage and is not used for the transmission of signals in said m transmission channels.

Consequently, when the transmitting circuit sends signals, the currents injected in the transmission conductors are associated with return currents flowing mainly in the reference conductor or in a power supply conductor. The specialist understands that this situation often creates unwanted couplings with other electronic circuits near the interconnection.

The specialists understand that the terminations (4) of FIGS. 1 and 2 are used for reducing reflections, and that such terminations produce return currents flowing mainly in the reference conductor or in a power supply conductor. Consequently, these terminations increase the generation of electromagnetic disturbances which may degrade the performances of nearby circuits, and the vulnerability to electromagnetic disturbances produced by nearby circuits.

The French patent application number 07/04421 of 21 Jun. 2007, entitled "Dispositif d'interface pseudo-différential avec circuit de terminaison" and the international application number PCT/IB2008/051826 of 8 May 2008, entitled "Pseudo-differential interfacing device having a termination circuit", describe terminations which do not produce return currents flowing mainly in the reference conductor or in a power supply conductor. Such terminations may therefore be used to improve pseudo-differential transmission. However, prior art transmitting circuits for pseudo-differential transmission nevertheless produce return currents flowing mainly in the reference conductor or in a power supply conductor. Consequently, because of the limitations of these prior art transmitting circuits, prior art pseudo-differential systems for transmission generate electromagnetic disturbances which may degrade the performances of nearby circuits, and are vulnerable to electromagnetic disturbances produced by nearby circuits.

DESCRIPTION OF THE INVENTION

It is an object of the interfacing device of the invention to provide pseudo-differential transmission through an interconnection having two or more transmission conductors, the transmission presenting reduced unwanted couplings.

The invention is about a device for transmitting signals through a plurality of transmission channels, in a known frequency band, comprising:

m signal terminals, a common terminal and a reference terminal (ground), the signal terminals and the common terminal being intended to be connected to an interconnection having at least m+1 conductors, m being an integer greater than or equal to 2, said common terminal being not connected to said reference terminal;

a transmitting circuit receiving q "input signals of the transmitting circuit" corresponding each to a transmission channel, q being an integer greater than or equal to 2 and less than or equal to m, the output of the transmitting circuit being coupled to at least q of said signal terminals, the output of the transmitting circuit delivering, when the transmitting circuit is in the activated state, q transmission variables, each transmission variable being either a voltage between one of said signal terminals and said common terminal or a current flowing out of one of said signal terminals, each transmission variable being mainly determined by one and only one of said "input signals of the transmitting circuit"; and a balancing circuit delivering, when the transmitting circuit is in the activated state, a current into said common terminal, the total current flowing out of said common terminal being, when the transmitting circuit is in the activated state, in at least a part of said known frequency band, approximately equal to a sum of three terms, the first term being a constant current, the second term being the opposite of the sum of the currents flowing out of said signal terminals, and the third term being the current which would flow out of a passive two-terminal circuit element subject to the voltage between said common terminal and said reference terminal.

According to the invention, the common terminal is not connected to the reference terminal, in order to allow the operation of the balancing circuit. In the following, the wordings "is in the deactivated state" and "is not in the activated state" are equivalent.

According to the invention, each transmission variable delivered by said transmitting circuit is determined by one and only one of said "input signals of the transmitting circuit", when the transmitting circuit is in the activated state. According to the invention, it is possible that there is a deactivated state of the transmitting circuit, in which the behavior of the transmitting circuit is different. However, the existence of a deactivated state of the transmitting circuit is not at all a characteristic of the invention.

According to the invention, the wording "the current which would flow out of a two-terminal circuit element subject to the voltage between said common terminal and said reference terminal" obviously refers to the most general "current flowing out of a two-terminal circuit element subject to the voltage between said common terminal and said reference terminal", that is to say a current which, at each point in time, is solely determined by the history, up to this point in time, of the voltage between said common terminal and said reference terminal. The specialist understands that this wording does not imply that a two-terminal circuit element subject to the voltage between said common terminal and said reference terminal is actually present in a device of the invention: the two-terminal circuit element is only used for modeling the current flowing out of said common terminal.

According to the invention, said two-terminal circuit element used for modeling the current flowing out of said common terminal is a passive two-terminal circuit element in the meaning of circuit theory (a passive circuit element is a circuit element in which the energy absorbed can only be positive or zero), but this two-terminal circuit element is not necessarily linear. Said third term may therefore be the current which would flow out of a non-linear passive two-terminal circuit element, for instance a diode. Conversely, said third term may be the current which would flow out of a linear passive two-terminal circuit element, for instance a resistor. Consequently, a device of the invention may be such that said total current flowing out of said common terminal approximates, when the transmitting circuit is in the activated state, in at least a part of said known frequency band, a sum of three terms, the first term being a constant current, the second term being the opposite of the sum of the currents flowing out of said signal terminals, and the third term being the current which would flow out of a passive linear two-terminal circuit element subject to the voltage between said common terminal and said reference terminal.

According to the invention, the output of said transmitting circuit is coupled to at least q of said signal terminals. The output of said transmitting circuit may also be coupled to said common terminal. For instance, we shall see that the output of the transmitting circuit of the seventh embodiment, shown in FIG. 11, is coupled to the common terminal. Conversely, the output of said transmitting circuit may be not coupled to said common terminal. For instance, we shall see that the output of the transmitting circuit of the second embodiment, shown in FIG. 5, and the output of the transmitting circuit of the sixth embodiment, shown in FIG. 9, are not coupled to the common terminal.

Let us number said signal terminals from 1 to m. For any integer j greater than or equal to 1 and less than or equal to m, let us use $i_j$ to denote the current flowing out of the signal terminal number j. According to the invention, if we use $i_{C0}$ to denote said constant current of said first term, if we use $Y_D$ to denote the admittance, at a given frequency f in said part of said known frequency band, of said passive linear two-terminal circuit element subject to the voltage between said common terminal and said reference terminal, and if we use $v_C$ to denote the voltage between said common terminal and said reference terminal, the current $i_C$ flowing out of said common terminal is such that $$i_C \approx -\sum_{\alpha=1}^{m} i_\alpha - Y_D v_C \quad \text{if } f \neq 0 \qquad (1)$$

and $$i_C \approx i_{C0} \sum_{\alpha=1}^{m} i_\alpha - Y_D v_C \quad \text{if } f = 0 \qquad (2)$$

The specialists understand how they can build a balancing circuit used in the interfacing device of the invention.

A device of the invention may comprise a receiving circuit delivering, when the receiving circuit is in the activated state, p "output signals of the receiving circuit" corresponding each to a transmission channel, p being an integer greater than or equal to 1 and less than or equal to m, the input of the receiving circuit being coupled to at least p of said signal terminals and to said common terminal, each of said "output signals of the receiving circuit" being mainly determined by the voltage between one of said signal terminals and said common terminal.

If the device of the invention comprises said receiving circuit, this receiving circuit delivers "output signals of the receiving circuit" corresponding each to a transmission channel, when the receiving circuit is in the activated state. According to the invention, it is possible that there is a deactivated state of the receiving circuit, in which the behavior or the receiving circuit is different. However, the existence of a deactivated state of the receiving circuit is not at all a characteristic of the invention.

A device of the invention may be such that said balancing circuit, said transmitting circuit and said receiving circuit (if the device of the invention comprises a receiving circuit) are without any part in common to any two of them. Consequently, a device of the invention may be such that said balancing circuit has no part in common with said transmitting circuit. Conversely, an interfacing device of the invention may be such that said balancing circuit, said transmitting circuit and said receiving circuit (if the device of the invention comprises a receiving circuit) are not without any part in common to any two of them. This possibility will be discussed below in the presentation of the third and fifth embodiments. In particular, a device of the invention may be such that said balancing circuit has at least one part in common with said transmitting circuit.

Even in the case of a device of the invention in which said balancing circuit, said transmitting circuit and said receiving circuit (if the device of the invention comprises a receiving circuit) are not without any part in common to any two of them, the specialist understands that the functions of the balancing circuit, of the transmitting circuit and of the receiving circuit (if the device of the invention comprises a receiving circuit) are distinct. The definition of a device of the invention, this definition being based on the presence of a balancing circuit, of a transmitting circuit and possibly of a receiving circuit, must therefore be understood as a definition relating to functions.

A device of the invention may be used in such a way that said interconnection and the other devices coupled to said interconnection approximately behave, from the perspective of the device of the invention, in a specified frequency band, as a network consisting firstly of an isolated circuit having exactly m+1 terminals, each terminal of the isolated circuit being connected either to one of said signal terminals or to said common terminal, and secondly of a passive two-terminal circuit element connected between said common terminal and said reference terminal. In the following, this use shall be referred to as "the contemplated use", but "the contemplated use" is only a non-limiting example of implementation of a device of the invention. In "the contemplated use", the specialist understands that:

when the transmitting circuit of the device of the invention is in the activated state, the signals sent through the interconnection by the transmitting circuit are not associated with any current flowing through the reference conductor;
the object of providing a pseudo-differential transmission presenting reduced unwanted couplings is achieved;
said isolated circuit may be passive, in which case "the contemplated use" corresponds to unidirectional transmission;
said isolated circuit may sometimes generate signals, in which case "the contemplated use" may correspond to bidirectional transmission.

Said interconnection having m+1 conductors may be realized using a cable. Said interconnection may also be realized without using a cable, for instance an interconnection formed in or on a rigid or flexible printed circuit board (using traces and/or copper areas), or an interconnection formed in or on the substrate of a multi-chip module (MCM) or of an hybrid circuit, or an interconnection formed inside a monolithic integrated circuit.

The explanations which will be provided below for the embodiments show that a device of the invention may be such that it does not comprise a transformer. This characteristic is essential for realizing a device of the invention inside an integrated circuit. A device of the invention may be such that it constitutes a part of an integrated circuit, said interconnection being realized inside said integrated circuit. In this case, it is possible that said m signal terminals and/or said common terminal are not coupled to pins of said integrated circuit.

A device of the invention may be such that it constitutes a part of an integrated circuit, each of said m signal terminals being coupled to one or more pins of said integrated circuit, said common terminal being coupled to one or more pins of said integrated circuit. This configuration is appropriate when said interconnection is realized outside said integrated circuit. The specialist notes that if there are many signal terminals, for instance more than 16 signal terminals, the absolute value of the current which may flow through the common terminal may become much larger than the maximum absolute value of the current flowing through a single signal terminal. Consequently, in this case, if a single pin is allocated to the common terminal, a degradation of transmission may occur for fast signals, because of the inductance of a connection using a single pin. In this case, using several pins for the common terminal reduces this inductance and improves transmission.

A device of the invention may comprise a termination circuit such as one of the termination circuits described in said French patent application number 07/04421 and said international application number PCT/IB2008/051826. Consequently, a device of the invention may comprise a termination circuit coupled to each of said signal terminals and to said common terminal, the termination circuit being, when the termination circuit is in the activated state, approximately equivalent, for said signal terminals and said common terminal, to a network consisting of m branches, each of said branches having a first terminal and a second terminal, each of said branches consisting of a passive two-terminal circuit element connected in series with a voltage source delivering a constant voltage, the first terminal of each of said branches being connected to one and only one of said signal terminals, the second terminal of each of said branches being connected to said common terminal, each of said signal terminals being connected to said first terminal of one and only one of said branches. The termination circuit in the activated state behaves approximately, for said signal terminals and said common terminal, as a network comprising passive two-terminal circuit elements having each a terminal held at a fixed voltage with respect to said common terminal. Said fixed voltage may be positive, negative or zero. Said fixed voltage may be the same for all said terminals held at a fixed voltage. Conversely, said fixed voltage may be different for two or more of said terminals held at a fixed voltage.

In this definition of a termination circuit, it is possible that said passive two-terminal circuit elements may be considered as linear. Consequently, according to the invention, said termination circuit in the activated state may, for said signal terminals and said common terminal, be approximately equivalent to a network consisting of m branches, each of said branches having a first terminal and a second terminal, each of said branches consisting of a passive linear two-terminal circuit element connected in series with a voltage source delivering a constant voltage, the first terminal of each of said branches being connected to one and only one of said signal terminals, the second terminal of each of said branches being connected to said common terminal, each of said signal terminals being connected to said first terminal of one and only one of said branches. Such a termination circuit in the activated state presents, with respect to said common terminal, at any frequency, a diagonal impedance matrix of size m\m. According to the invention, it is possible that there is a deactivated state of the termination circuit, in which the behavior of the termination circuit is different from the one defined above. However, the existence of a deactivated state of the termination circuit is not at all a characteristic of the invention.

An interfacing device of the invention may be such that said termination circuit is made of a network of m resistors, each of said resistors being connected between one of said signal terminals and said common terminal, each of said resistors being connected to a different signal terminal.

A termination circuit made of a network of resistors is however not at all a characteristic of the invention. By way of a first example, designers may, in order to reduce the power consumed by the termination circuit, choose to allow the termination circuit to be effective only in a relevant interval of frequencies, for instance by including suitable reactive circuit elements in the termination circuit. By way of a second example, the termination circuit could include active components, for instance insulated gate field-effect transistors (MOSFETs) operating in the ohmic regime. The impedance of the channel of such components may be adjustable by electrical means. Consequently, said termination circuit may be such that the impedance matrix, with respect to said common terminal, of said termination circuit in the activated state can be adjusted by electrical means.

In the case where the termination circuit has an activated state and a deactivated state, the impedance of the channel of one or more MOSFETs may for instance be controlled by one or more control signals taking on different values in the activated state and in the deactivated state. Consequently, said termination circuit may be such that said termination circuit has an activated state and a deactivated state, the impedance matrix, with respect to said common terminal, of said termination circuit in the activated state being different from the impedance matrix, with respect to said common terminal, of said termination circuit in the deactivated state.

In the case where the termination circuit has an activated state and a deactivated state, components such as transistors may for instance be used as switches having a closed state and an open state. In this case, said transistors may for instance be in the closed state when the termination circuit is in the activated state, and be in the open state when the termination circuit is in the deactivated state. Consequently, said termination circuit may be such that said termination circuit has an activated state and a deactivated state, each current flowing from said termination circuit to one of said signal terminals being substantially zero when said termination circuit is in the deactivated state. Designers may, in order to reduce the power consumed by the termination circuit, choose to put such a termination circuit in the deactivated state when the transmitting circuit is in the activated state. Such a termination circuit may for instance use one of the principles shown in FIGS. 10 and 11 of said French patent application number 07/04421 and said international application number PCT/IB2008/051826.

An interfacing device of the invention may be such that said termination circuit has no part in common with said balancing circuit and/or with said transmitting circuit and/or, if the device of the invention comprises a receiving circuit, with said receiving circuit. Conversely, an interfacing device of the invention may be such that said termination circuit has one or more parts in common with said balancing circuit and/or with said transmitting circuit and/or, if the device of the invention comprises a receiving circuit, with said receiving circuit.

According to the invention, the number m of signal terminals may be equal to the number q of "input signals of the transmitting circuit". In the opposite case, m>q, and the signal terminals which are not allocated to a transmission variable may have another function, for instance providing reference voltages or power feeding.

If the device of the invention comprises said receiving circuit, the number m of signal terminals may be equal to the number p of "output signals of the receiving circuit". In the opposite case, m>p, and the signal terminals which are not used for determining an "output signal of the receiving circuit" may have another function, for instance receiving reference voltages or power feeding. In particular, an interfacing device of the invention may be such that m is greater than or equal to three.

According to the invention, the q "input signals of the transmitting circuit" may for instance be applied to the transmitting circuit using q single-ended links. According to the invention, the q "input signals of the transmitting circuit" may for instance be applied to the transmitting circuit using q differential links. According to the invention, the p "output signals of the receiving circuit" may for instance be delivered using p single-ended links. According to the invention, the p "output signals of the receiving circuit" may for instance be delivered using p differential links.

According to the invention, the transmitting circuit and/or the receiving circuit may have a filtering function, for instance for the purpose of obtaining a pre-emphasis, a de-emphasis or an equalization improving transmission. It then becomes necessary to synthesize the corresponding filters, either as analog filters or as digital filters, using one of the many methods known to specialists.

When losses are not negligible in the interconnection, phase and amplitude distortions may occur, which are referred to as distortions caused by propagation. The reduction of these distortions may be obtained, in a device of the invention, using an equalization reducing the effects of the distortions caused by propagation, said equalization being implemented in said transmitting circuit and/or in said receiving circuit. This type of processing, which is also sometimes referred to as compensation, is well known to specialists, and may be implemented using analog signal processing or digital signal processing. Specialists know that it is commonplace to use adaptive algorithms for implementing this type of processing in receivers for data transmission. A device of the invention may use an adaptive equalization. This type of processing is well known to specialists, and is often implemented using digital signal processing.

BRIEF DESCRIPTION OF THE DRAWINGS

Other advantages and characteristics of the invention will appear more clearly from the following description of particular embodiments of the invention, given by way of non-limiting examples, with reference to the accompanying drawings in which.

DETAILED DESCRIPTION OF SOME EMBODIMENTS

First Embodiment

Figure 1:
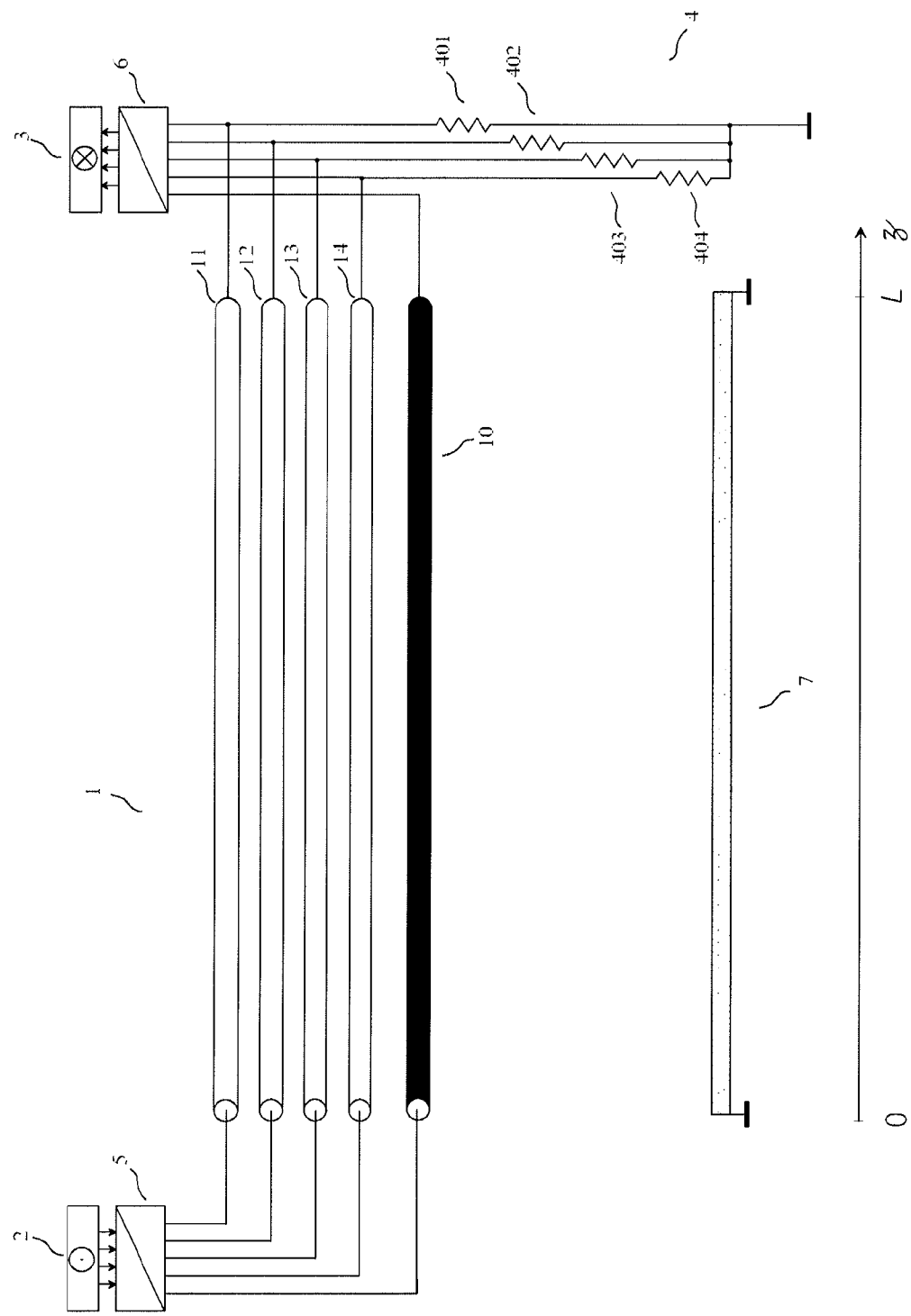
FIG. 1 shows a first pseudo-differential system for transmission comprising an interconnection having four transmission conductors, and has already been discussed in the section dedicated to the presentation of prior art.
Figure 2:
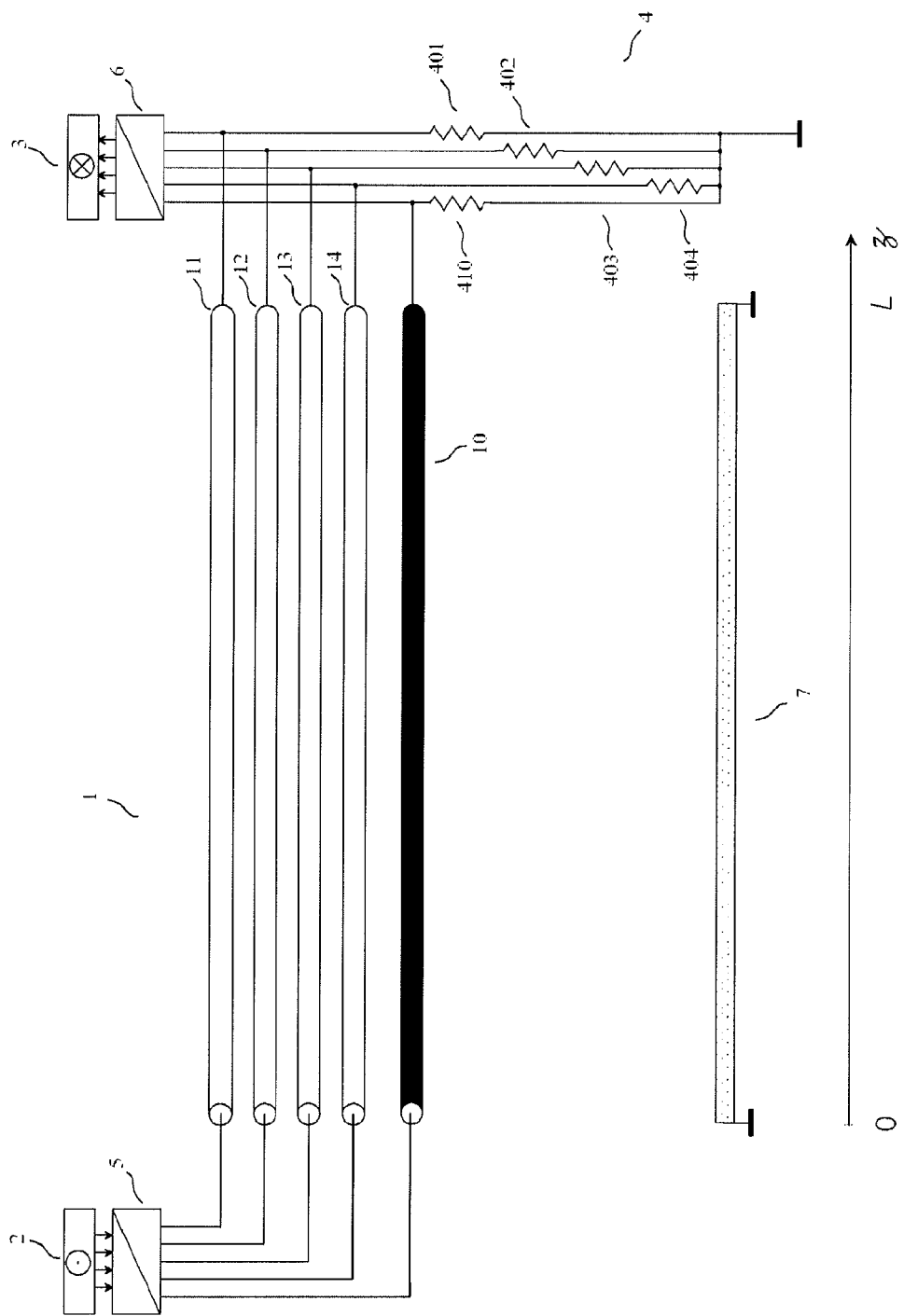
FIG. 2 shows a second pseudo-differential system for transmission comprising an interconnection having four transmission conductors, and has already been discussed in the section dedicated to the presentation of prior art.
Figure 3:
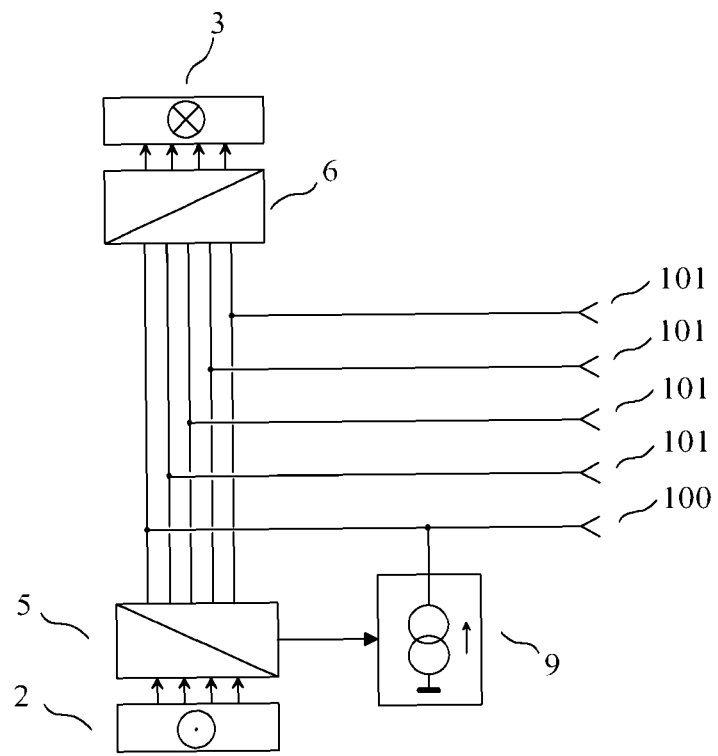
FIG. 3 shows a first embodiment of the invention.

As a first embodiment of an interfacing device of the invention, given by way of non-limiting example, we have represented in FIG. 3 an interfacing device of the invention built inside an integrated circuit, comprising m=4 signal terminals (101) and a common terminal (100), the signal terminals (101) and the common terminal (100) being intended to be connected to an interconnection having at least m+1=5 conductors.

A transmitting circuit (5) receives q=4 "input signals of the transmitting circuit" coming from a source (2), the output of the transmitting circuit being coupled to the 4 signal terminals (101) and to the common terminal (100). The output of the transmitting circuit (5) delivers, when the transmitting circuit is in the activated state, q=4 transmission variables, each transmission variable being a voltage between one of said signal terminals (101) and said common terminal (100), each transmission variable being mainly determined by only one of said "input signals of the transmitting circuit". When the transmitting circuit (5) is not in the activated state, its output presents a high impedance, so that the transmitting circuit (5) does not produce transmission variables and only causes a negligible current through the signal terminals (101) and the common terminal (100).

A receiving circuit (6) delivers, when the receiving circuit is in the activated state, p=4 "output signals of the receiving circuit" corresponding each to a transmission channel, the input of the receiving circuit being coupled to the 4 signal terminals (101) and to the common terminal (100), each of said "output signals of the receiving circuit" being determined by the voltage between one of said signal terminals (101) and said common terminal (100). The "output signals of the receiving circuit" are delivered to the destination (3).

When the receiving circuit (6) is not in the activated state, its output presents a high impedance, so that the receiving circuit (6) does not deliver any "output signal of the receiving circuit".

The specialists know several suitable methods for producing a high impedance state at the output of the transmitting circuit (5) and at the output of the receiving circuit (6). The possibility of controlling the activated state of a transmitting circuit and/or of a receiving circuit is usually used in data bus architectures. We note that the circuits needed to control the activated state of the transmitting circuit (5) and of the receiving circuit (6) at a given point in time are not shown in FIG. 3. We also note that the address and/or control lines necessary for coordinating the activated state of the transmitting circuit (5) and of the receiving circuit (6) with the operation of the other entities connected to such a bus are not shown in FIG. 3. These address and/or control lines could be conductors of said interconnection.

The balancing circuit (9) is such that, when the transmitting circuit is in the activated state, the current $i_C$ flowing out of the common terminal (100) approximates the sum of three terms, the first term being a constant current $i_{C0}$, the second term being the opposite $-(i_1+i_2+i_3+i_4)$ of the sum of the currents $i_1$, $i_2$, $i_3$ and $i_4$ flowing out of the signal terminals (101) and the third term being the current flowing out of a passive linear two-terminal circuit element subject to the voltage between the common terminal and a reference node of the integrated circuit. In the case where the voltage $v_C$ between the common terminal and said reference node is sinusoidal, the third term is the current $-v_C Y_D$ flowing out of the passive linear two-terminal circuit element of admittance $Y_D$. Here, we find again the equations (1) and (2).

Figure 4:
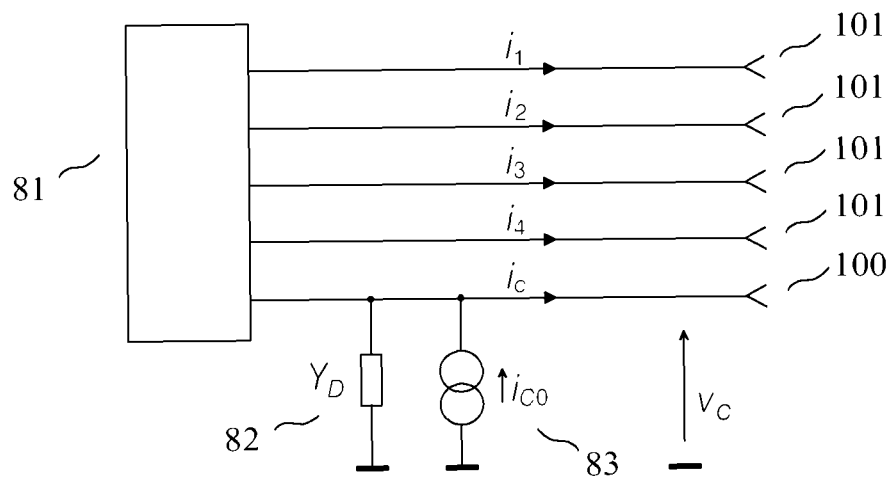
FIG. 4 shows an equivalent network for the first embodiment.

An interconnection coupled to the signal terminals (101) and to the common terminal (100) sees a circuit element having m+2=6 terminals if we include the reference terminal (ground). The FIG. 4 shows an equivalent network of the circuit element having m+2 terminals seen by the interconnection when the transmitting circuit is in the activated state, in an ideal implementation. The specialists understand that such an equivalent network is only suitable for determining the voltages between these 6 terminals and the currents flowing out of these terminals. In FIG. 4, we find an isolated circuit (81) having exactly m+1 terminals, a passive linear two-terminal circuit element (82) of admittance $Y_D$ and a current source (83) delivering the constant current $i_{C0}$. The isolated circuit (81) is not necessarily linear. The admittance of the passive linear two-terminal circuit element (82) may be frequency-dependent. The isolated circuit (81) having exactly m+1 terminals, the current flowing out of its terminal connected to the common terminal (100) is exactly $-(i_1+i_2+i_3+i_4)$. Consequently, the circuit shown in FIG. 4 complies with the equations (1) and (2). We note that the current source (83) of FIG. 4 does not correspond to the balancing circuit (9) of FIG. 3: the current source (83) of FIG. 4 is only a circuit element of the equivalent schematic diagram of the circuit element having m+2 terminals seen by the interconnection, in an ideal implementation.

The specialist understands that, in a real implementation, it is possible that the current flowing out of the common terminal (100) does not exactly correspond to said sum of three terms. Consequently, the equivalent schematic diagram of FIG. 4 is only an approximation.

The specialist understands how he may, using prior techniques, design a transmitting circuit (5) delivering transmission variables when the transmitting circuit is in the activated state, each transmission variable being a voltage between one of said signal terminals (101) and said common terminal (100). Examples of transmitting circuits suitable for delivering such transmission variables will be given in the presentations of the sixth embodiment and of the seventh embodiment.

The specialist understands that a prior art receiver for pseudo-differential signals may be used as a receiving circuit (6) delivering "output signals of the receiving circuit" when the receiving circuit is in the activated state, each of the "output signals of the receiving circuit" being determined by the voltage between one of said signal terminals (101) and said common terminal (100).

Second Embodiment

Figure 5:
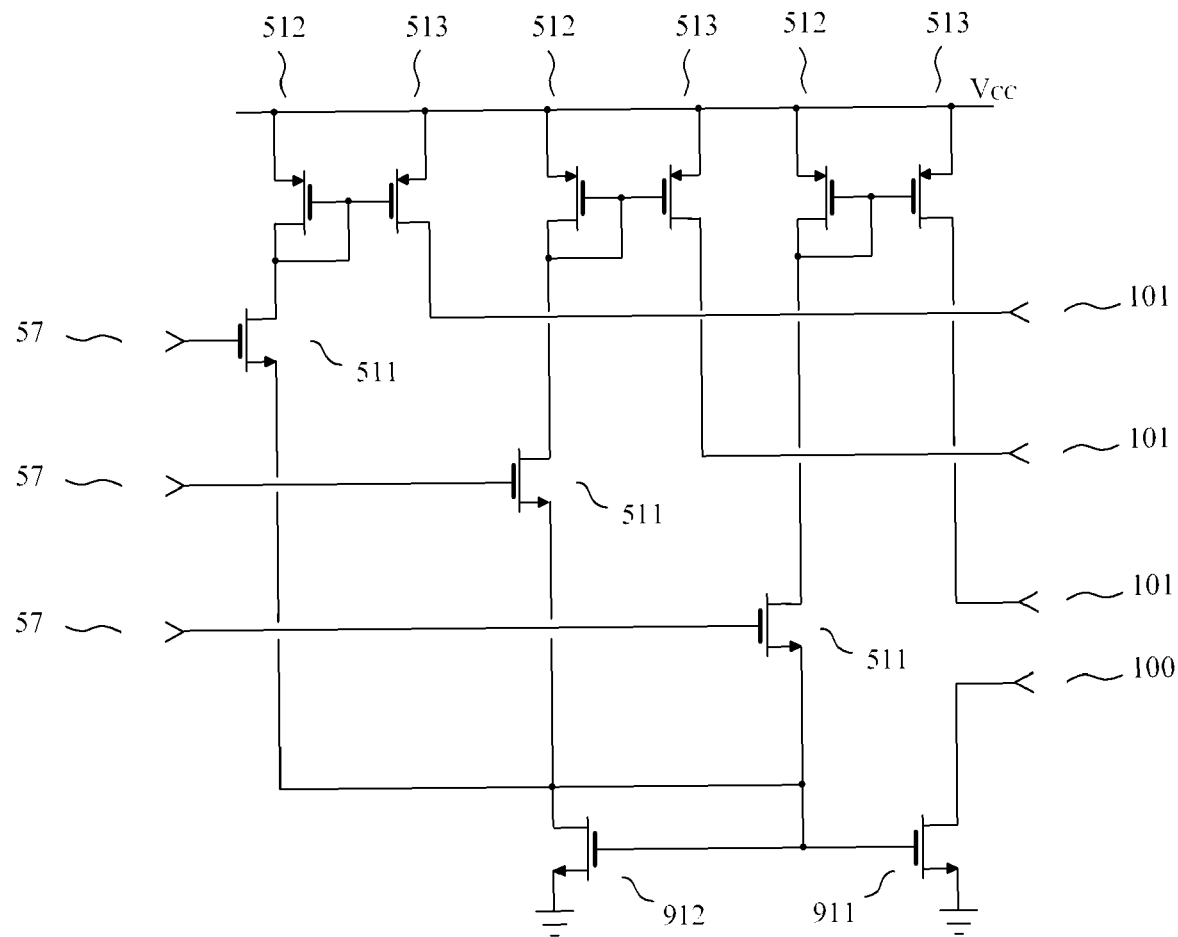
FIG. 5 shows a transmitting circuit and a balancing circuit used in a second embodiment.

The second embodiment of an interfacing device of the invention, given by way of non-limiting example, comprises the transmitting circuit and the balancing circuit shown in FIG. 5, in which:

each of the q=3 "input signals of the transmitting circuit" is applied to an input (57) which is of the single-ended input type;

each of the q=3 inputs (57) corresponds to a three-transistor cell made of an input transistor (511) and of a current mirror comprising two transistors (512) (513);

each of the m=3 signal terminals (101) is coupled to the drain of the output transistor (513) of the corresponding three-transistor cell;

the transmitting circuit is made of the three three-transistor cells, hence of 9 transistors (511) (512) (513);

the sources of the input transistors (511) are connected to the input of a current mirror comprising two transistors (911) (912);

the common terminal (100) is connected to the drain of the output transistor (911) of this current mirror;

the balancing circuit is made of this current mirror (911) (912).

Let us note that the sources of the transistors of this current mirror (911) (912) are grounded, the ground symbol used in FIG. 5 and in the following figures having exactly the same meaning as the other ground symbol used in the FIGS. 1 to 4.

The transmitting circuit shown in FIG. 5 delivers, when the biasing of the inputs (57) is appropriate, transmission variables, each transmission variable being a current flowing out of one of the signal terminals (101), each transmission variable being approximately determined by only one of the "input signals of the transmitting circuit", which is an input voltage. The specialist understands that applying a voltage near zero between each input (57) and ground deactivates the transmitting circuit shown in FIG. 5, and that in this case its output presents a high impedance.

The specialist sees that the circuits shown in FIG. 5 may be proportioned such that, for a suitable biasing of the inputs (57), of the signal terminals (101) and of the common terminal (100), the current flowing out of the common terminal (100) approximates the opposite of the sum of the currents flowing out of the signal terminals (101), that is to say $$i_C \approx -\sum_{\alpha=1}^{m} i_\alpha \qquad (3)$$

This approximate equation is independent of frequency and is compatible with the equations (1) and (2), for $i_{C0}=0$ and for $Y_D=0$. In particular, it is clear for the specialist that the circuits shown in FIG. 5 are suitable for "the contemplated use" defined above.

The circuits shown in FIG. 5 are such that the balancing circuit and the transmitting circuit are without part in common. We note that, in FIG. 5, the transmitting circuit is not coupled to the common terminal (100). We also note that, in FIG. 5, when the transmitting circuit is in the activated state, the instantaneous current flowing out of each signal terminal (101) is positive and the instantaneous current flowing out of the common terminal (100) is negative. However, this is not a general characteristic of a device of the invention.

Third Embodiment

Figure 6:
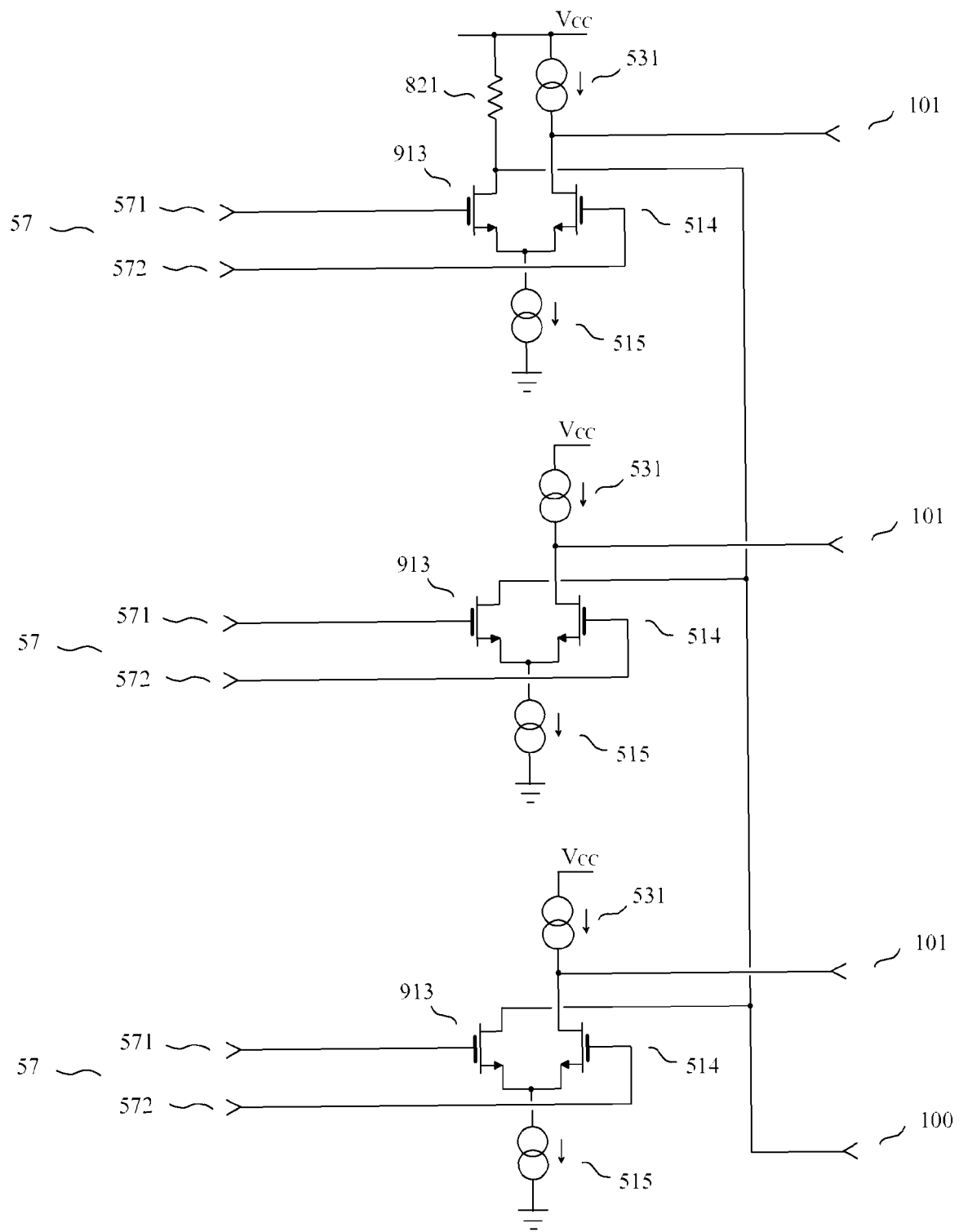
FIG. 6 shows a transmitting circuit and a balancing circuit used in a third embodiment and a fourth embodiment.

The third embodiment of an interfacing device of the invention, given by way of non-limiting example, comprises the transmitting circuit and the balancing circuit shown in FIG. 6, in which:
each of the q=3 "input signals of the transmitting circuit" is applied to an input (57) which is a differential input comprising 2 terminals (571) (572);
each of the q=3 inputs (57) corresponds to the input of a differential pair made of two transistors (514) (913) whose sources are biased by a current source (515) supplying a practically constant current I;
each of the m=3 signal terminals (101) is connected to the drain of the first transistor (514) of each of said differential pairs and to a current source (531) supplying a current approximating I/2 and practically constant;
the common terminal (100) is connected to the drains of the q second transistors (913) of said differential pairs and to a resistor (821) connected to a power supply terminal.

The specialist understands that the current sources (515) (531) shown in FIG. 6 are ideal circuit elements which may be realized with real components, for instance using current mirrors. The transmitting circuit shown in FIG. 6 delivers, when the transmitting circuit is in the activated state, transmission variables, each transmission variable being a current flowing out of one of the signal terminals (101), each transmission variable being approximately determined by one of the "input signals of the transmitting circuit".

The specialist understands that it is easy to realize a circuit controlling the parameter I determining the current delivered by the current sources (515) (531), and that an "enable" control signal may set this parameter to a value near zero. In this case, the transmitting circuit shown in FIG. 6 is not in the activated state and its output presents a high impedance.

The specialist sees that the circuits shown in FIG. 6 produce, at each of the m signal terminals (101), a current determined by only one of the "input signals of the transmitting circuit", and such that $$i_C \approx -\frac{qI}{2} - \sum_{a=1}^{m} i_a + \frac{V_{CC} - v_C}{R_D} \quad (4)$$

where $V_{CC}$ is the voltage between said power supply terminal and the reference terminal and where $R_D$ is the resistance of the resistor (821). This equation is frequency-independent and is compatible with the equations (1) and (2), for $$i_{C0} \approx \frac{V_{CC}}{R_D} - \frac{qI}{2} \quad (5)$$

and for $Y_D=1/R_D$. In particular, it is clear for the specialist that the circuits shown in FIG. 6 are suitable for "the contemplated use" defined above.

The specialist notes that, in FIG. 6, for a suitable biasing of the inputs (57), of the signal terminals (101) and of the common terminal (100), all components contribute to the function of the transmitting circuit and to the function of the balancing circuit. Consequently, only an arbitrary decision could split up the components into components belonging only to the transmitting circuit and components belonging only to the balancing circuit. In the case of FIG. 6, we consequently see that the balancing circuit has parts in common with the transmitting circuit.

Fourth Embodiment

Figure 7:
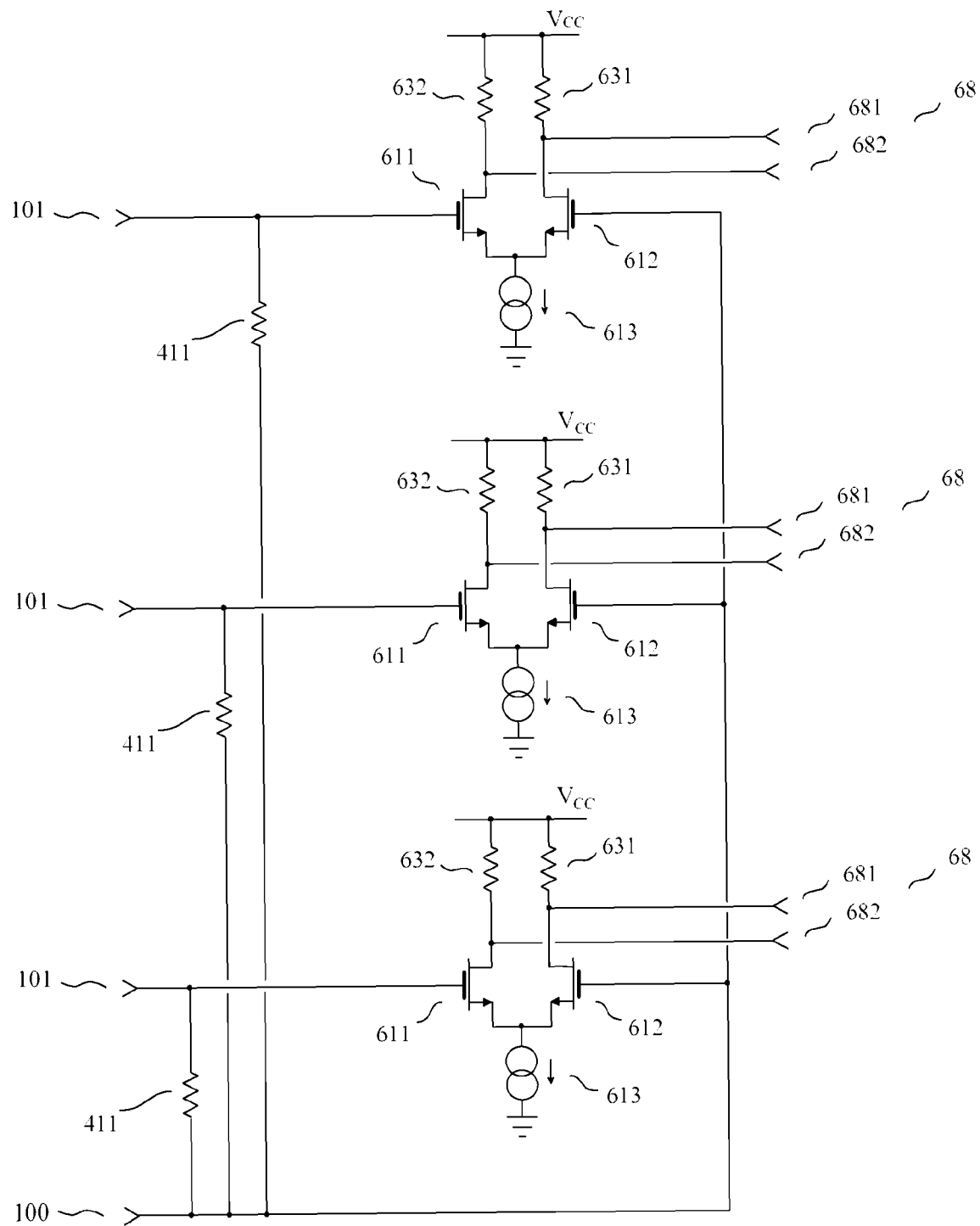
FIG. 7 shows a receiving circuit and a termination circuit used in the fourth embodiment.

The fourth embodiment of an interfacing device of the invention, given by way of non-limiting example, comprises:
the transmitting circuit and the balancing circuit shown in FIG. 6;
the receiving circuit and the termination circuit shown in FIG. 7.

The transmitting circuit and the balancing circuit shown in FIG. 6 have already been presented in the explanations concerning the third embodiment.

In the receiving circuit and the termination circuit shown in FIG. 7:
each of the p=3 "output signals of the receiving circuit" is delivered to an output (68) which is a differential output comprising 2 terminals (681) (682);
each of the p outputs (68) corresponds to the output of a differential pair made of two transistors (611) (612) whose sources are biased by a current source (613) and whose drains are biased by two resistors (631) (632);
each of the m=3 signal terminals (101) is connected to the gate of the first transistor (611) of one of said differential pairs;
the common terminal (100) is connected to the gate of the n second transistors (612) of said differential pairs;
the termination circuit is made of m resistors (411), each of these resistors being connected between a signal terminal (101) and the common terminal (100), the receiving circuit being composed of the other components shown in FIG. 7.

The specialist sees that the receiving circuit shown in FIG. 7 produces at its outputs p "output signals of the receiving circuit" corresponding each to one of the transmission channels, each of the "output signals of the receiving circuit" being determined by the voltage between one of said signal terminals (101) and said common terminal (100).

In FIG. 7, if we neglect the gate currents of the transistors (611) (612) of the differential pairs, only the resistors (411) of the termination circuit produce currents in the signal terminals (101) and in the common terminal (100). We note that the equations (4) and (5) remain applicable to the device of the invention.

This fourth embodiment is appropriate for transmitting and receiving analog or digital signals.

Fifth Embodiment

Best Mode

Figure 8:
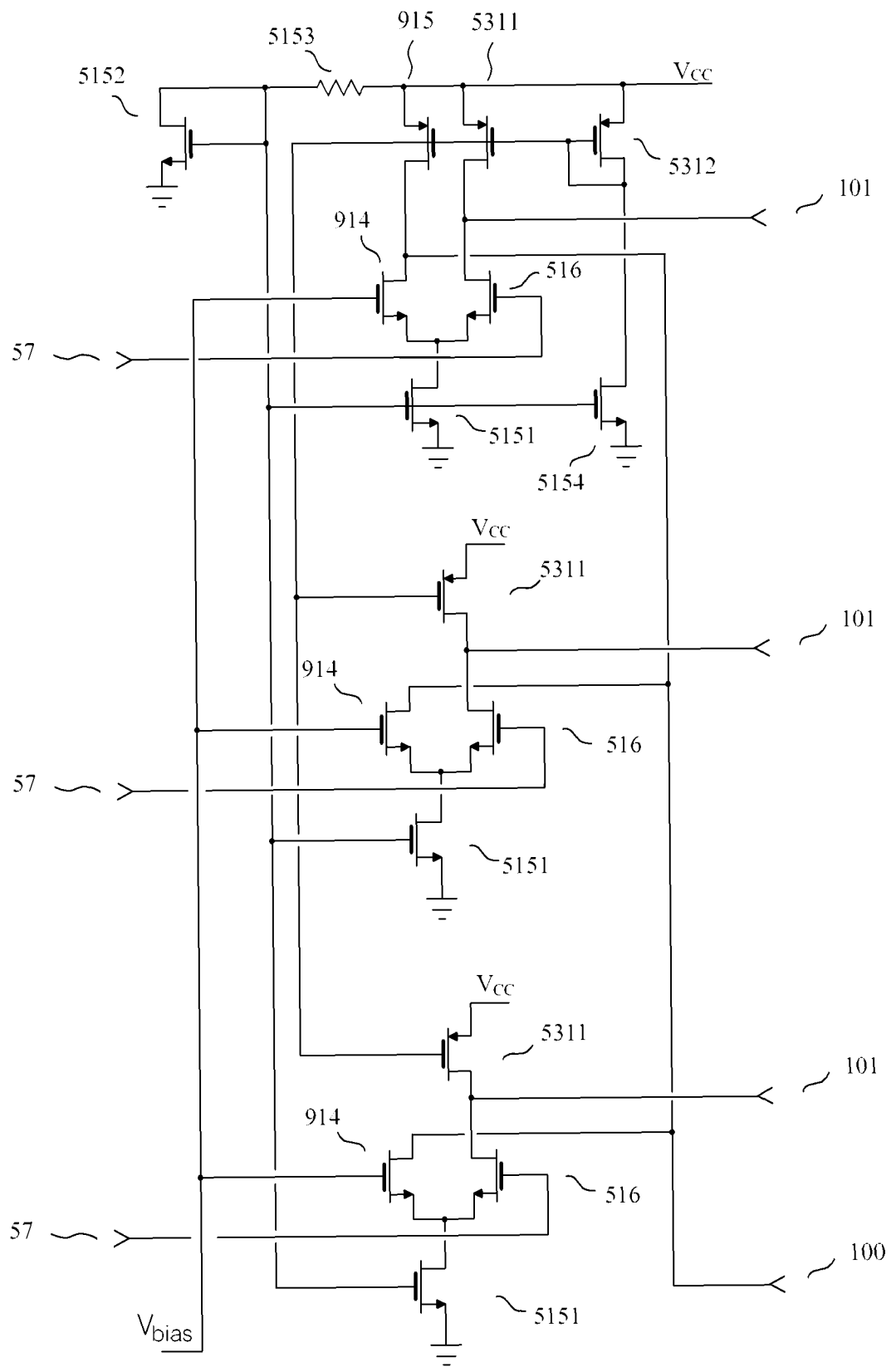
FIG. 8 shows a transmitting circuit and a balancing circuit used in a fifth embodiment.

The fifth embodiment of an interfacing device of the invention, given by way of non-limiting example and best mode of carrying out the invention, comprises the transmitting circuit and the balancing circuit shown in FIG. 8, in which:

each of the q=3 "input signals of the transmitting circuit" is applied to an input (57) which is a single-ended input;

each of the q=3 inputs (57) is connected to the gate of a first transistor (516) forming with a second transistor (914) a differential pair, the sources of this differential pair being biased by the drain of an output transistor (5151) of a first current mirror, this drain supplying a practically constant current I;

a resistor (5153) defines the current flowing through the input transistor (5152) of said first current mirror;

the drain current of an output transistor (5154) of said first current mirror defines the current flowing through the input transistor (5312) of a second current mirror;

each of the m=3 signal terminals (101) is connected to the drain of the first transistor (516) of one of said differential pairs and to the drain of an output transistor (5311) of the second current mirror, this drain supplying a current approximating I/2 and practically constant;

the common terminal (100) is connected to the drains of the q second transistors (914) of said differential pairs and to the drain of an output transistor (915) of said second current mirror, this drain supplying a current approximating qI/2 and practically constant;

the balancing circuit is made of the q second transistors (914) of the differential pairs and of the output transistor (915) of the second current mirror, the transmitting circuit being made of the other components shown in FIG. 8.

The transmitting circuit shown in FIG. 8 is always in the activated state, and the biasing of the gates of the transistors (516) (914) of the differential pairs is adequate for the operation described above.

The transmitting circuit shown in FIG. 8 delivers transmission variables, each transmission variable being a current flowing out of one of the signal terminals (101), each transmission variable being approximately determined by one and only one of the "input signals of the transmitting circuit".

The specialist sees that, as in the second embodiment, the circuits shown in FIG. 8 produce, for a suitable biasing of the inputs (57), of the signal terminals (101) and of the common terminal (100), a current flowing out of the common terminal (100) approximating the opposite of the sum of the currents flowing out of the signal terminals (101), that is to say, the equation (3) is applicable. In particular, it is clear for the specialist that the circuits shown in FIG. 8 are suitable for "the contemplated use" defined above.

The circuits shown in FIG. 8 are defined in such a way that the balancing circuit and the transmitting circuit are without part in common. However, it is clear that the q second transistors (914) of the differential pairs, defined as being part of the balancing circuit, are necessary to the operation of the transmitting circuit. Conversely, it is clear that the q output transistors (5151) of the first current mirror providing each a current I to a differential pair, defined as being part of the transmitting circuit, are necessary to the operation of the balancing circuit. Consequently, it would also be possible to consider that the balancing circuit and the transmitting circuit have parts in common.

We note that, in FIG. 8, when the transmitting circuit is in the activated state, the instantaneous current flowing out of each signal terminal (101) and the instantaneous current flowing out of the common terminal (100) may take on positive and/or negative values.

This fifth embodiment is intended for transmitting digital signals. In this fifth embodiment, the interfacing device of the invention also comprises a receiving circuit (not shown in FIG. 8), which may be of any suitable known type of pseudo-differential receiver for digital signals, for instance one of the pseudo-differential receivers described in said U.S. Pat. Nos. 5,994,925 and 7,099,395.

Sixth Embodiment

Figure 9:
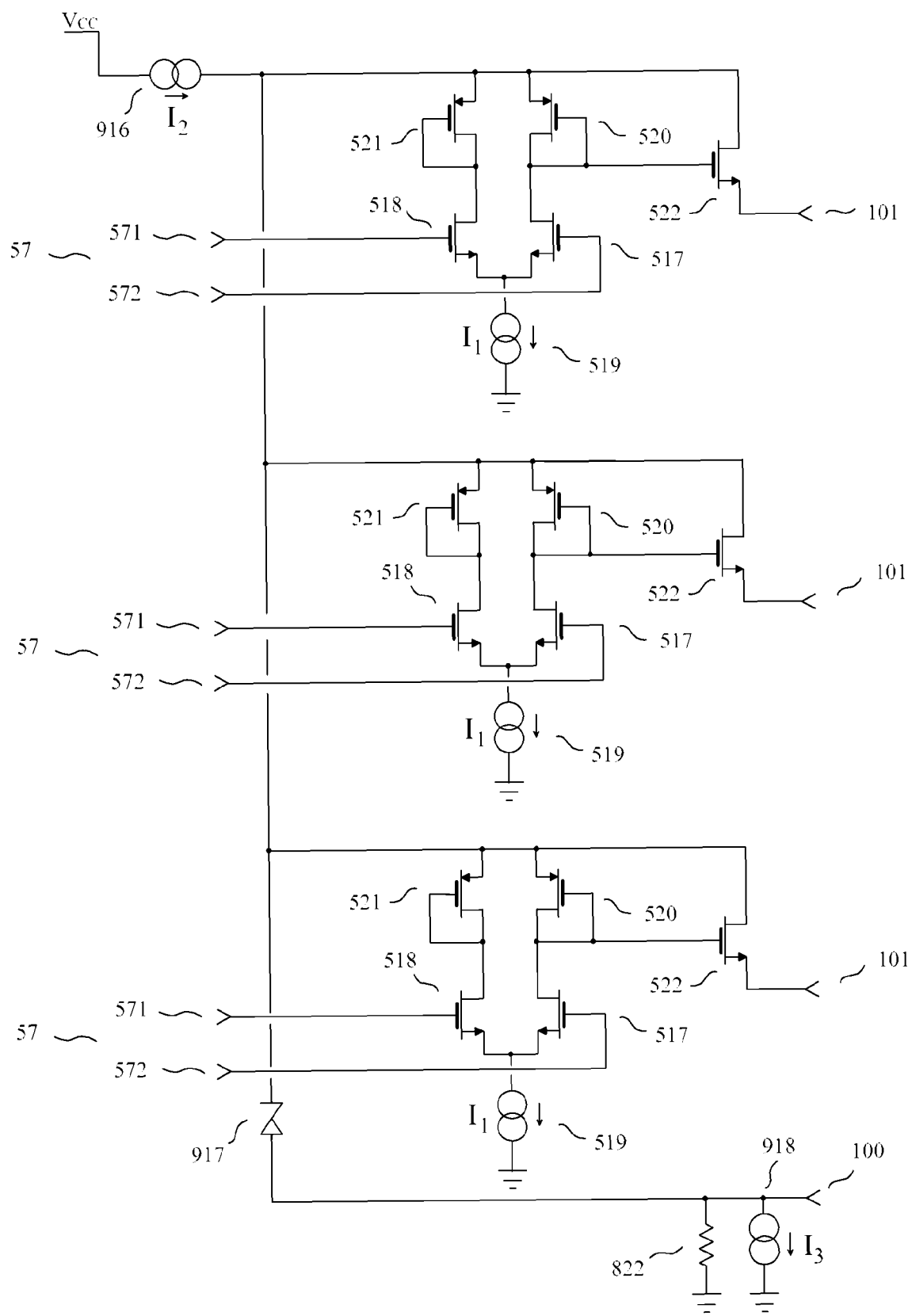
FIG. 9 shows a transmitting circuit and a balancing circuit used in a sixth embodiment.

The sixth embodiment of an interfacing device of the invention, given by way of non-limiting example, comprises the transmitting circuit and the balancing circuit shown in FIG. 9, in which:

each of the q=3 "input signals of the transmitting circuit" is applied to an input (57) which is a differential input comprising 2 terminals (571) (572);

each of the q=3 inputs (57) corresponds to the input of a differential pair made of two transistors (517) (518) whose sources are biased by a current source (519) supplying a practically constant current $I_1$;

the drains of the transistors (517) (518) of the differential pairs are biased by active loads (520) (521);

the drain voltage of the first transistor (517) of each differential pair is the input of a common-drain output buffer (522) the output of which is connected to one of the m=3 signal terminals (101);

the sources of the active loads (520) (521) and the drains of the output buffers (522) are biased by a current source (916) supplying a practically constant current $I_2$, this current $I_2$ being greater than $qI_1$, and by a shunt voltage regulator (917) maintaining a practically constant voltage with respect to the common terminal (100);

the common terminal (100) is connected to a current source (918) supplying a practically constant current $I_3$, this current approximating $I_2-qI_1$;

a resistor (822) is connected in parallel with this last current source (918);

the balancing circuit consists of the current source (916) supplying the current $I_2$, of the shunt voltage regulator (917), of the current source (918) supplying the current $I_3$ and of the resistor (822), the transmitting circuit being composed of the other components shown in FIG. 9.

The specialist understands how the current sources (519) (916) (918) shown in FIG. 9 may be realized with real components, for instance using current mirrors. The circuits shown in FIG. 9 produce, at the common terminal (100), a current such that $$i_C \approx -\sum_{a=1}^{m} i_a + \frac{v_C}{R_D} \tag{6}$$

where $R_D$ is the resistance of the resistor (822). This equation is frequency-independent and is compatible with the equations (1) and (2), for $i_{C0}=0$ and for $Y_D=1/R_D$). In particular, it is clear for the specialist that the circuits shown in FIG. 9 are suitable for "the contemplated use" defined above.

The transmitting circuit shown in FIG. 9 delivers, when the transmitting circuit is in the activated state, transmission variables, each transmission variable being a voltage between one of said signal terminals (101) and said common terminal (100). We note that the transmitting circuit shown in FIG. 9 is not connected to the common terminal (100).

The specialist understands that he may easily design a circuit controlling the parameters $I_1$ and $I_2$ determining the currents supplied by the current sources (519) (916) (918), and that an "enable" signal may set these parameters to a value near zero. In this case, the transmitting circuit shown in FIG. 9 is not in the activated state and its output presents a high impedance.

In FIG. 9, the resistor (822) could be replaced with the channel of an insulated gate field-effect transistor operating in the ohmic regime, presenting an admittance which may be adjusted by electrical means. Consequently, a device for transmitting signals of the invention may be such that said total current flowing out of said common terminal approximates, when the transmitting circuit is in the activated state, a sum of three terms, the first term being a constant current, the second term being the opposite of the sum of the currents flowing out of said signal terminals, and the third term being the current which would flow out of a passive linear two-terminal circuit element subject to the voltage between said common terminal and said reference terminal, the admittance of said passive linear two-terminal circuit element subject to the voltage between said common terminal and said reference terminal being adjustable by electrical means.

Seventh Embodiment

The seventh embodiment of an interfacing device of the invention, given by way of non-limiting example, is an example of a device of the invention comprising a transmitting circuit using a negative feedback, for an improved accuracy.

Figure 10:
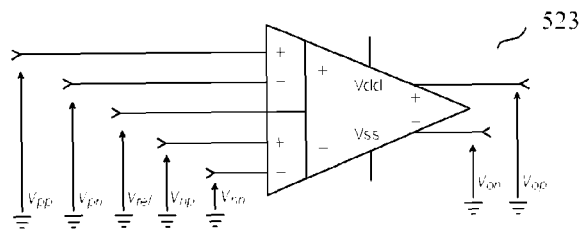
FIG. 10 shows the symbol used for a fully balanced differential difference amplifier.

FIG. 10 shows a fully balanced differential difference amplifier (hereinafter referred to as FB-DDA). A FB-DDA may for instance be such as described in the article of J. F. Duque-Carrillo et al entitled "Fully Differential Building Blocs Based on Fully Differential Difference Amplifiers with Unity-Gain Difference Feedback" published in the journal *IEEE Transactions on Circuits and Systems I*, vol. 42, No. 3, in March 1995 or such as described in the article of H. Alzaher and M. Ismail entitled "A CMOS Fully Balanced Differential Difference Amplifier and its Applications" published in the journal *IEEE Transactions on Circuits and Systems II*, vol. 48, No. 6, in June 2001. The FB-DDA (523) shown in FIG. 10 has five input terminals corresponding to the 5 voltages $v_{pp}$, $v_{pn}$, $v_{ref}$, $v_{np}$ and $v_{nn}$ with respect to ground, two power supply terminals labeled Vdd and Vss, and two output terminals. The positive output terminal and the negative output terminal correspond to the voltages $v_{op}$ and $v_{on}$ with respect to ground, respectively. By definition, the FB-DDA (523) complies, for small signals, with the two equations $$v_{op} - v_{on} = A[(v_{pp} - v_{pn}) - (v_{np} - v_{nn})] \quad (7)$$

and $$\frac{v_{op} + v_{on}}{2} = v_{ref} \quad (8)$$

where A is a voltage gain.

Figure 11:
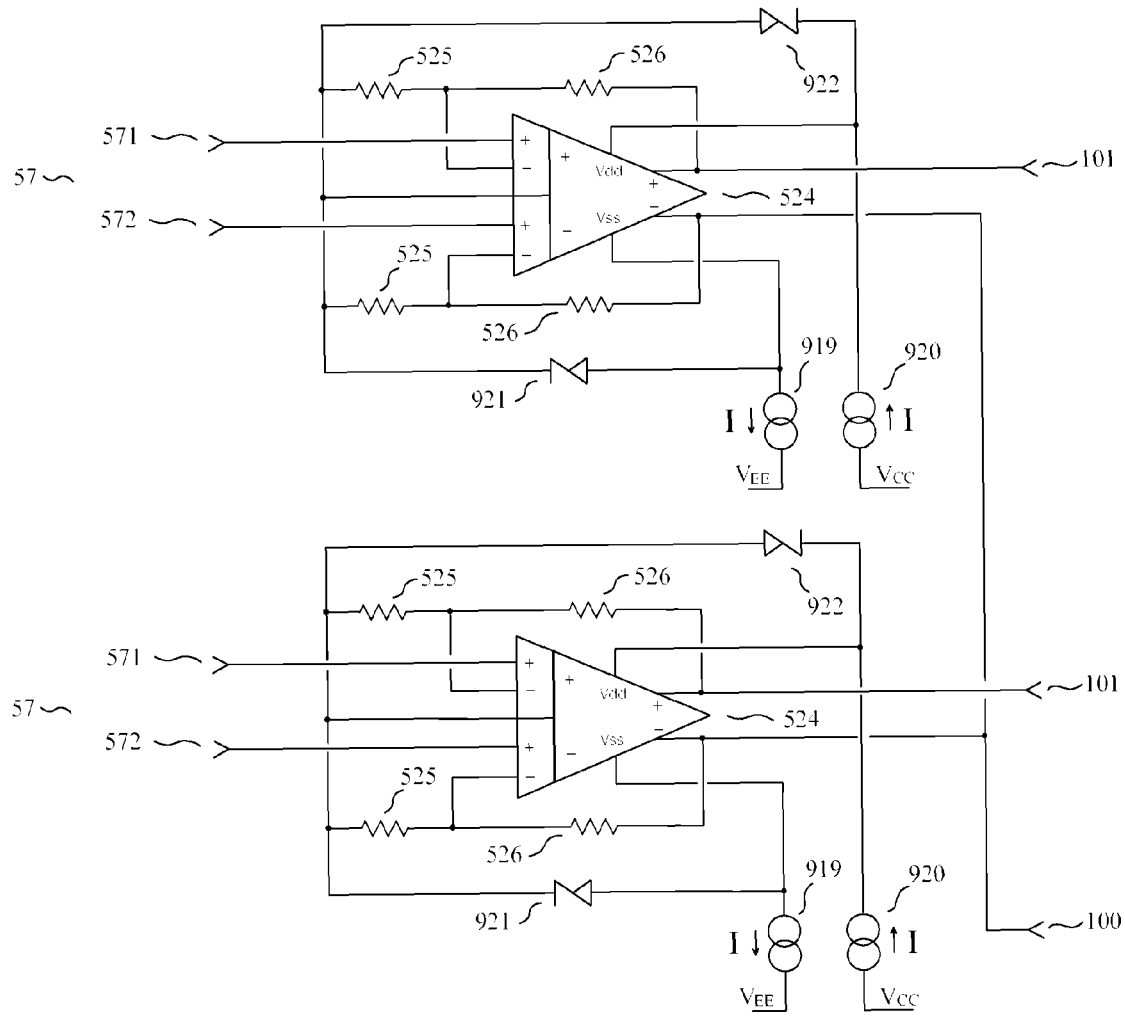
FIG. 11 shows a transmitting circuit and a balancing circuit used in a seventh embodiment.

The seventh embodiment of an interfacing device of the invention comprises the transmitting circuit and the balancing circuit shown in FIG. 11, in which:

each of the q=2 "input signals of the transmitting circuit" is applied to an input (57) which is a differential input comprising 2 terminals (571) (572);

each of the q=2 inputs (57) is coupled to a circuit comprising a FB-DDA (524) and two voltage dividers each made of two resistors (525) (526), this circuit being such that the negative feedback imposes that the voltage $v_{op}-v_{on}$ only depends on the voltage between the terminals (571) (572) of the corresponding differential input, and such that the voltage $v_{op}-v_{on}$ is proportional to the voltage between the terminals (571) (572) of the corresponding differential input;

the positive output of each FB-DDA is connected to a signal terminal (101);

the balancing circuit consists, for each FB-DDA (524), of the part of the FB-DDA corresponding to its negative output, this negative output being connected to the common terminal (100), and of a floating power supply made of two current sources (919) (920) and of two shunt voltage regulators (921) (922) maintaining a practically constant voltage between the power supply terminals of the FB-DDAs (524);

the transmitting circuit consists of all components shown in FIG. 11, except the components and parts of component already identified as belonging to the balancing circuit.

The circuits shown in FIG. 11 produce, at the common terminal (100), a current complying with the equation (3). In particular, it is clear for the specialist that the circuits shown in FIG. 11 are suitable for "the contemplated use" defined above. The transmitting circuit shown in FIG. 11 delivers, when the transmitting circuit is in the activated state, transmission variables, each transmission variable being a voltage between one of said signal terminals (101) and said common terminal (100). We note that the transmitting circuit shown in FIG. 11 is connected to the common terminal (100), because some of the resistors (526) are connected to the common terminal (100). We also note that, in FIG. 11, when the transmitting circuit is in the activated state, the instantaneous current flowing out of each signal terminal (101) and the instantaneous current flowing out of the common terminal (100) may take on positive and/or negative values.

The specialist understands that the circuits shown in FIG. 11 may be much more accurate than the circuits shown in FIG. 9, and that the circuits shown in FIG. 9 may be much faster than the circuits shown in FIG. 11. The circuits shown in FIG. 11 are therefore particularly suitable for the transmission of analog signals in a bandwidth smaller than 500 MHz.

Eighth Embodiment

Figure 12:
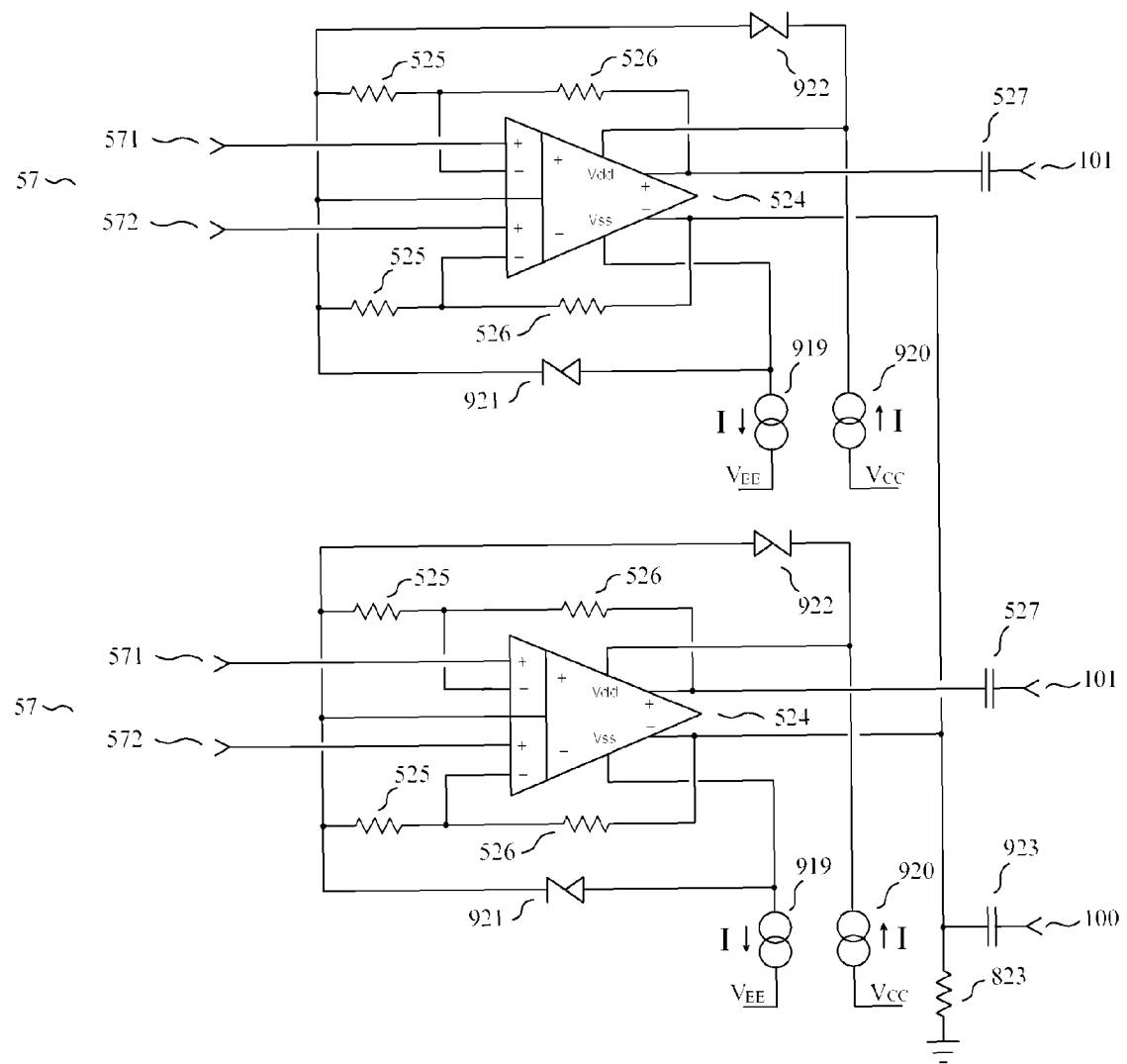
FIG. 12 shows a transmitting circuit and a balancing circuit used in a eighth embodiment.

The eighth embodiment of an interfacing device of the invention, given by way of non-limiting example, is an example of a device of the invention using alternating current (ac) coupling with the interconnection. The eighth embodiment of an interfacing device of the invention comprises the transmitting circuit and the balancing circuit shown in FIG. 12, in which:

as in FIG. 11, each of the q=2 "input signals of the transmitting circuit" is applied to an input (57) which is a differential input comprising 2 terminals (571) (572);

as in FIG. 11, each of the q=2 inputs (57) is coupled to a circuit comprising a FB-DDA (524) and two voltage dividers each made of two resistors (525) (526);

the positive output of each FB-DDA is connected to a signal terminal (101) through a capacitor (527) providing an ac coupling;

the balancing circuit consists of a capacitor (923) having a first terminal connected to the common terminal (100), of a resistor (823) connected to ground and to a second terminal of said capacitor (923) having a first terminal connected to the common terminal (100), and, for each FB-DDA (524), of the part of the FB-DDA corresponding to its negative output, and of a floating power supply made of two current sources (919) (920) and of two shunt voltage regulators (921) (922) maintaining a practically constant voltage between the power supply terminals of the FB-DDAs (524);

the negative output of each FB-DDA (524) is coupled to the common terminal (100) through said capacitor (923) having a first terminal connected to the common terminal (100);

the transmitting circuit consists of all components shown in FIG. 12, except the components and parts of component already identified as belonging to the balancing circuit.

Said capacitor (923) having a first terminal connected to the common terminal (100) and said resistor (823) connected to ground and to the second terminal of said capacitor (923) having a first terminal connected to the common terminal (100) are such that the total current flowing out of said common terminal approximates, in at least a part of said known frequency band, the value given by the equation (6) where $R_D$ is the resistance of said resistor (823) connected to ground and to the second terminal of said capacitor (923) having a first terminal connected to the common terminal (100). The transmitting circuit shown in FIG. 12 delivers, when the transmitting circuit is in the activated state, transmission variables, each transmission variable being a voltage between one of said signal terminals (101) and said common terminal (100).

INDICATIONS ON INDUSTRIAL APPLICATIONS

The interfacing device of the invention is suitable for pseudo-differential transmission between integrated circuits through an interconnection having two or more transmission conductors, the transmission presenting reduced unwanted couplings.

We note that, in the embodiments of an interfacing device of the invention, given above by way of non-limiting examples and shown in the FIGS. 5 to 9, the active components are MOSFETs. This is not at all a characteristic of the invention, and specialists understand that it would have also been possible to use bipolar transistors or other types of active components. Consequently, the interfacing device of the invention may be implemented in integrated circuits made using any applicable manufacturing process.

The invention is suitable for the protection against the noise produced by unwanted electromagnetic couplings in printed circuit boards. The invention is particularly advantageous to printed circuit boards comprising wide-band analog circuits or fast digital circuits. For sending in q transmission channels, the invention has the advantage of only requiring q+1 pins on an integrated circuit providing the functions of the transmitting circuit and of the balancing circuit, as opposed to 2q pins in the case of a transmitter for differential transmission.

The interfacing device of the invention is particularly suitable for pseudo-differential transmission inside an integrated circuit, because it provides a good protection against the noise related to the currents flowing in the reference conductor and in the substrate of the integrated circuit.

An interfacing device of the invention may be built inside an integrated circuit, but this is not at all a characteristic of the invention. For instance, it could be interesting that the transmitting circuit and the balancing circuit be built inside an integrated circuit, a termination circuit being built outside this integrated circuit.

Since the invention includes the possibility of a deactivated state for the terminals intended to be connected to said interconnection, for instance a high impedance state, the invention is suitable for an implementation in a data bus architecture.

The invention is particularly suitable for multilevel signaling, because this type of transmission scheme is more sensitive to noise than binary signaling.

The invention, in particular when said transmission variables used by said transmitting circuit are currents, is particularly suitable for simultaneous bidirectional signaling, because this type of transmission scheme is more sensitive to noise than unidirectional signaling.

The invention claimed is:

1. A device for transmitting signals through a plurality of transmission channels, in a known frequency band, comprising:

m signal terminals, a common terminal and a reference terminal, the signal terminals and the common terminal being configured to be connected to an interconnection having at least m+1 conductors, m being an integer greater than or equal to 2;

a transmitting circuit receiving q "input signals of the transmitting circuit" corresponding each to a transmission channel, q being an integer greater than or equal to 2 and less than or equal to m, the output of the transmitting circuit being coupled to at least q of the signal terminals, the output of the transmitting circuit delivering, when the transmitting circuit is in the activated state, q transmission variables, each transmission variable being either a voltage between one of the signal terminals and the common terminal or a current flowing out of one of the signal terminals, each transmission variable being mainly determined by one and only one of "the input signals of the transmitting circuit"; and a balancing circuit delivering, when the transmitting circuit is in the activated state, a current into the common terminal, the total current flowing out of the common terminal being, when the transmitting circuit is in the activated state, in at least a part of the known frequency band, approximately equal to a sum of three terms, the first term being a constant current, the second term being the opposite of the sum of the currents flowing out of the signal terminals, and the third term being the current flowing out of a passive two-terminal circuit element subject to the voltage between the common terminal and the reference terminal.

2. The device of claim 1, wherein the total current flowing out of the common terminal approximates, when the transmitting circuit is in the activated state, in at least a part of the known frequency band, a sum of three terms, the first term being a constant current, the second term being the opposite of the sum of the currents flowing out of the signal terminals, and the third term being the current flowing out of a passive linear two-terminal circuit element subject to the voltage between the common terminal and the reference terminal.

3. The device of claim 2, wherein the admittance of the passive linear two-terminal circuit element subject to the voltage between the common terminal and the reference terminal is adjustable by electrical means.

4. The device of claim 1, further comprising a receiving circuit delivering, when the receiving circuit is in the activated state, p "output signals of the receiving circuit" corresponding each to a transmission channel, p being an integer greater than or equal to 1 and less than or equal to m, the input of the receiving circuit being coupled to at least p of the signal terminals and to the common terminal, each of "the output signals of the receiving circuit" being mainly determined by the voltage between one of the signal terminals and the common terminal.

5. The device of claim 1, wherein the balancing circuit has at least one part in common with the transmitting circuit.

6. The device of claim 1, wherein the device constitutes a part of an integrated circuit, the interconnection being realized inside the integrated circuit.

7. The device of claim 1, wherein the device constitutes a part of an integrated circuit, each of the m signal terminals being coupled to one or more pins of the integrated circuit, the common terminal being coupled to one or more pins of the integrated circuit.

8. The device of claim 1, further comprising a termination circuit coupled to each of the signal terminals and to the common terminal, the termination circuit being, when the termination circuit is in the activated state, for the signal terminals and the common terminal, approximately equivalent to a network consisting of m branches, each of the branches having a first terminal and a second terminal, each of the branches consisting of a passive linear two-terminal circuit element connected in series with a voltage source delivering a constant voltage, the first terminal of each of the branches being connected to one and only one of the signal terminals, the second terminal of each of the branches being connected to the common terminal, each of the signal terminals being connected to the first terminal of one and only one of the branches.

9. The device of claim 8, wherein the impedance matrix, with respect to the common terminal, of the termination circuit in the activated state can be adjusted by electrical means.

10. The device of claim 8, wherein the termination circuit has an activated state and a deactivated state, each current flowing from the termination circuit to one of the signal terminals being substantially zero when the termination circuit is in the deactivated state.

* * * * *